(12) United States Patent
Choi

(10) Patent No.: US 12,553,935 B2
(45) Date of Patent: Feb. 17, 2026

(54) PINBOARD REPAIR JIG AND PINBOARD ASSEMBLY

(71) Applicant: Samsung Display Co., Ltd., Yongin-Si (KR)

(72) Inventor: Woongil Choi, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 142 days.

(21) Appl. No.: 18/427,819

(22) Filed: Jan. 31, 2024

(65) Prior Publication Data

US 2024/0393385 A1 Nov. 28, 2024

(30) Foreign Application Priority Data

May 26, 2023 (KR) .......................... 10-2023-0068688

(51) Int. Cl.
*G01R 31/28* (2006.01)

(52) U.S. Cl.
CPC ................................ *G01R 31/2808* (2013.01)

(58) Field of Classification Search
None
See application file for complete search history.

(56) References Cited

FOREIGN PATENT DOCUMENTS

| KR | 10-0666731 | B1 | | 1/2007 | |
|----|------------|----|---|--------|---|
| KR | 10-1188362 | B1 | | 10/2012 | |
| KR | 10-1923587 | B1 | | 11/2018 | |
| KR | 10-2152200 | B1 | | 9/2020 | |
| KR | 10-2371861 | B1 | | 3/2022 | |
| TW | 202224278  | A  | * | 6/2022 | |
| WO | WO-2015022875 | A1 | * | 2/2015 | ........... H05K 1/0268 |

\* cited by examiner

*Primary Examiner* — Guerrier Merant
(74) *Attorney, Agent, or Firm* — Innovation Counsel LLP

(57) ABSTRACT

A pinboard repair jig is disclosed that includes a support, an top plate disposed on the support and to which a pinboard is mountable, a linear motion guide disposed between the support and the top plate, and an upwardly protruding pinboard from the top plate includes a location pin to which the pinboard is coupled.

20 Claims, 13 Drawing Sheets

PINBOARD REPAIR JIG AND PINBOARD ASSEMBLY

CROSS-REFERENCE TO RELATED APPLICATION

This application claims priority to and the benefit of Korean Patent Application No. 10-2023-0068688 filed at the Korean Intellectual Property Office on May 26, 2023, the entire contents of which are incorporated herein by reference.

BACKGROUND

(a) Technical Field

The present disclosure relates to a pinboard repair jig, and more particularly, to a jig for inspecting and repairing the pinboard, and to a pinboard assembly in which the pinboard is mounted on the jig.

(b) Description of the Related Art

Electronic devices such as display devices, semiconductor devices, and solar cells may undergo various inspections during and after manufacturing. For example, the electronic device may be placed on a stage of an automatic visual inspection system, and when the stage moves to a predetermined inspection unit of the automatic visual inspection system, the inspection unit may perform a visual inspection by taking pictures of the electronic device with a camera.

The automatic visual inspection system includes a pinboard for applying a signal to an object to be inspected that has been placed on the stage. Signals may be applied to the electronic device by contacting pins of the pinboard with test pads of the electronic device.

SUMMARY

As the pins of the pinboard come into contact with the test pads of electronic devices multiple times, foreign substances may accumulate on the pins. A contact defect may occur due to the foreign substances, and thus inspection reliability of the electronic devices may deteriorate. Therefore, the pinboard may require repairs such as inspecting the pins and removing the foreign substances.

Embodiments provide a pinboard repair jig capable of fixing a pinboard so as to facilitate inspection and repair of the pinboard, and a pinboard assembly in which the pinboard is mounted on the jig.

A pinboard repair jig according to an embodiment includes a support, a top plate disposed on the support and to which a pinboard is mountable, a linear motion guide disposed between the support and the top plate, and a location pin protruding upward from the top plate and to which the pinboard is coupled.

The support may include a first leg and a second leg spaced apart from each other and extending in a vertical direction, and a support plate connected to the first leg and the second leg and extending in a horizontal direction.

The pinboard repair jig may further include a fixing knob disposed at the first leg or the second leg.

The fixing knob may be fastened to a fastening hole formed in the first leg or the second leg.

The linear motion guide may include a linear rail extending in a first direction and a linear block coupled to the linear rail, and the top plate may linearly move in the first direction.

The linear block may be coupled to the support, and the linear rail may be coupled to the top plate.

The pinboard repair jig may further include stoppers disposed on both sides of the linear rail on a same line as the linear block or the linear rail and coupled to the top plate.

The linear motion guide may include a plurality of linear blocks aligned in a first direction and linear rails engaged with the plurality of linear blocks.

The location pins may include a first location pin and a second location pin for mounting different types of pinboards.

The top plate includes a first portion extending in a first direction, second and third portions extending from both ends of the first portion in a second direction, a fourth portion extending from the second portion in the first direction, and a fifth portion extending from the third portion in a direction opposite to the first direction.

The fourth portion and the fifth portion may face each other and be spaced apart at predetermined intervals.

The location pins may include a pair of first location pins disposed at the fourth portion and the fifth portion.

The location pin may further include a pair of second location pins disposed at the second portion and the third portion.

A pinboard assembly according to an embodiment includes a pinboard repair jig and a pinboard detachably coupled to the pinboard repair jig. The pinboard repair jig includes a support, an top plate disposed on the support and to which the pinboard is mounted, a linear motion guide disposed between the support and the top plate, and a location pin protruding upward from the top plate and to which the pinboard is coupled. The pinboard includes a body including a coupling portion in which holes are formed, a printed circuit board is coupled to the body, and pins are connected to the printed circuit board. The pinboard is mounted on the top plate so that the location pin is inserted into the hole and the printed circuit board is upward.

The linear motion guide may include a linear rail coupled to the top plate and extending in a first direction, and a linear block coupled to the support and engaged with the linear rail. The top plate and the pinboard may move linearly in the first direction.

The pinboard repair jig may further include stoppers disposed on both sides of the linear rail on a same line as the linear block or the linear rail, and coupled to the top plate.

The support may include a first leg and a second leg spaced apart from each other and extending in a vertical direction, and a support plate connected to the first leg and the second leg and extending in a horizontal direction. The pinboard repair jig may further include a fixing knob disposed at the first leg or the second leg.

The location pins may include a first location pin and a second location pin for mounting different types of pinboards.

The top plate includes a first portion extending in a first direction, second and third portions extending from both ends of the first portion in a second direction, a fourth portion extending from the second portion in the first direction, and a fifth portion extending from the third portion in a direction opposite to the first direction.

The fourth portion and the fifth portion may face each other and be spaced apart at predetermined intervals. The gap between the fourth portion and the fifth portion may accommodate a portion of the body which protrudes downward from the coupling portion.

According to embodiments, it is possible to provide a pinboard repair jig capable of fixing a pinboard so as to easily inspect and repair the pinboard, and a pinboard assembly in which the pinboard is mounted on the jig.

Further, according to the embodiments, there are advantageous effects that may be recognized throughout the specification.

DETAILED DESCRIPTION OF THE EMBODIMENTS

Figure 1:
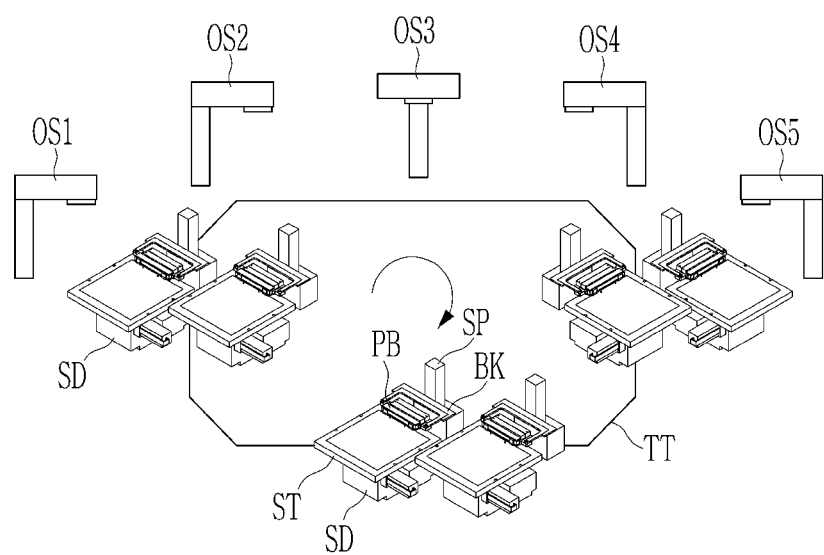
FIG. 1 is a drawing schematically illustrating an automatic visual inspection system according to an embodiment.

With reference to the accompanying drawings, the embodiments will be described in detail so that a person of an ordinary skill in the art can easily carry out.

When a layer, film, region, or plate is said to be "above" or "on" another part, this includes not only the case where it is "directly on" another element, but also the case where there is another element in the middle. Conversely, when a component is said to be "directly on top" of another component, it means that there are no intervening components.

Throughout the specification, a part may further include other constituent elements unless it is stated to the contrary that it "includes" a certain constituent element.

Throughout the specification, "connected" does not mean only when two or more constituent elements are directly connected, but when two or more constituent elements are indirectly connected through another constituent element, physically connected, or electrically connected, it may also include a case where each part, which is referred to by a different name according to its position or function, but is substantially integral, is connected to each other.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

In the drawings, signs "x", "y" and "z" under "y" are used to indicate directions, where "x" is a first direction, "y" is a second direction perpendicular to the first direction, and "z" is a third direction perpendicular to the first and second directions.

FIG. 1 is a drawing schematically illustrating an automatic visual inspection system according to an embodiment.

Referring to FIG. 1, an automatic visual inspection system (hereinafter referred to as "AVI system") includes a turn table TT, a stage ST, a stage driving unit SD, a pinboard PB, a bracket BK, a support SP, and inspection units OS1-OS5. Various types of inspections may be performed during or after manufacturing an object (hereinafter, a "display device" will be described as an example) to be inspected. The AVI system may automatically perform several checks to determine if the display device is defective. The AVI system may inspect, for example, characteristics of the display device, image, color (color viewing angle), touch sensor, appearance, and the like. The AVI system may be configured in various ways depending on the type of inspection.

The turn table TT may be positioned on a granite plate (not shown) and may rotate clockwise or counterclockwise. The turn table TT may transfer the stage ST including the object to be inspected to the inspection units OS1-OS5.

The stage ST may be positioned on the turn table TT. The stage ST may move as the turn table TT rotates. The AVI system may include a plurality of stages ST. For example, the AVI system may include eight sets of stages ST, and each set may include two stages ST. The total number of stages ST, the number of stages ST included in each set, and the like may be variously changed according to the design of the AVI system. A display device (or display panel), which is an object to be inspected, may be placed on the stage ST.

A pinboard PB, a bracket BK, and a post SP may be provided in each stage ST. The pinboard PB, the bracket BK, and the support SP may be positioned adjacent to the stage ST on the turn table TT, and may move together with the corresponding stage ST. The bracket BK may be vertically movably coupled to the support SP, and the pinboard PB may be detachably coupled to the bracket BK. The pinboard PB may be connected to the display device to apply a signal to the display device. When the turntable TT rotates at a predetermined angle and the stage ST and the pinboard PB corresponding thereto are moved to the place where the inspection units OS1-OS5 are positioned, the inspection units OS1-OS5 move the stage ST, and a predetermined inspection may be performed on the display device placed thereon.

The inspection units OS1-OS5 may be fixed at predetermined positions. For example, the inspection units OS1-OS5 may be arranged at predetermined intervals around the turntable TT. The inspection units OS1-OS5 include a characteristic inspection unit OS1 that inspects characteristics of the display device, an image inspection unit OS2 that inspects an image displayed on the display device, a color inspection unit OS3 that inspects the color of an image displayed on the display device, a touch sensor inspection unit OS4 that inspects the touch sensor of the display device, or an exterior inspection unit OS5 that inspects the exterior of the display device. The inspection target and arrangement order of each inspection unit OS1-OS5 may be changed in various ways. Each of the inspection units OS1-OS5 may include a camera and may further include an optical unit such as a light source and an optical sensor.

The stage driving unit SD may be positioned below the stage ST. The stage driving unit SD may drive the stage ST to move in a first direction x, a second direction y, or a third direction z.

The AVI system includes a loading unit (not shown) for loading a display device to be inspected onto the stage ST and an unloading unit (not shown) for unloading a display device that has been inspected from the stage ST may be included.

Figure 2:
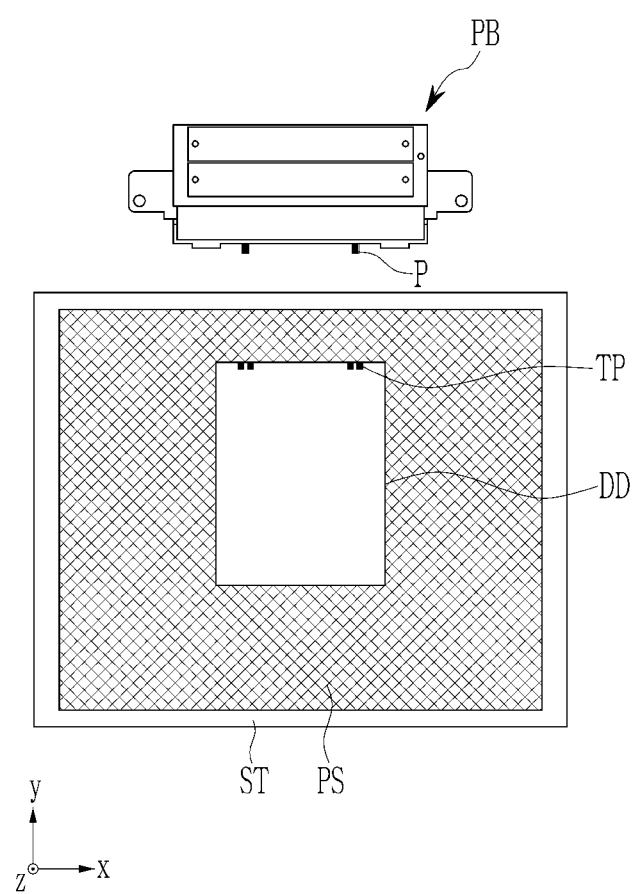
FIG. 2 is a schematic top plan view of a stage and a pinboard in an automatic visual inspection system according to an embodiment.
Figure 3:
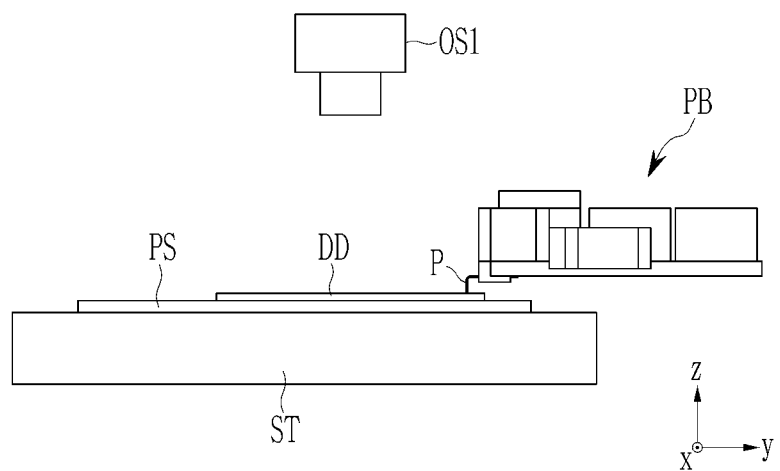
FIG. 3 is a schematic side view of a stage and a pinboard in an automated visual inspection system according to an embodiment.
Figure 4:
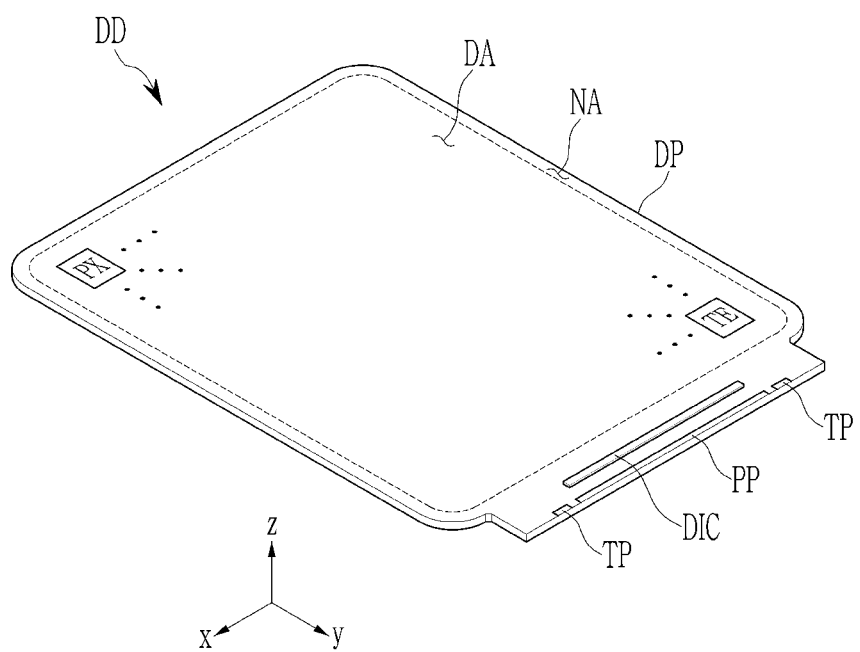
FIG. 4 is a perspective view schematically illustrating a display device according to an embodiment.

FIG. 2 is a schematic plan view of a stage and a pinboard in an automatic visual inspection system according to an embodiment, and FIG. 3 is a schematic side view of a stage and a pinboard in an automatic visual inspection system according to an embodiment. FIG. 4 is a perspective view schematically illustrating a display device according to an embodiment.

Referring to FIG. 2 and FIG. 3, a protection sheet PS may be positioned on the stage ST, and a display device DD may be positioned on the protection sheet PS. The pinboard PB may be disposed adjacent to the stage ST.

The stage ST may be porous and may vacuum-suck the display device DD placed thereon. The stage ST may have a square or rectangular planar shape. The stage ST may move in a first direction x, a second direction y, or a third direction z on the turntable TT.

The protective sheet PS may be provided to prevent the display device DD or the stage ST from being damaged when the display device DD is placed on the stage ST. The protective sheet PS may be made of an air permeable material such as a non-woven fabric so that the stage ST may vacuum adsorb the display device DD. In addition, it may be advantageous for the protective sheet PS to have durability such as impact resistance, chemical resistance, and abrasion resistance. The protective sheet PS may be an ultra-high molecular weight polyethylene sheet. For example, the protective sheet PS may be Nitto Denco's trade name SUNMAP™. The protective sheet PS may have a planar shape similar to that of the stage ST. For example, the protective sheet PS may have a square or rectangular planar shape. In order to prevent the protective sheet PS from moving or lifting on the stage ST, the protective sheet PS may be fixed to the stage ST using an adhesive tape (not shown) or the like.

The display device DD, which is an object to be inspected, may be loaded on the protective sheet PS. The display device DD may be vacuum adsorbed on the stage ST. Since the protective sheet PS is positioned between the stage ST and the display device DD, the display device DD or the stage ST may be damaged when loading or inspecting the display device DD (e.g., preventing the display device DD from being stamped).

The pinboard PB may be positioned adjacent to the stage ST. The stage ST and the pinboard PB may move so that the pins P of the pinboard PB contact the test pads TP of the display device DD. For example, the stage ST may move in a first direction x or a second direction y, and the pinboard PB may move in a third direction z. The pinboard PB may drive the display panel DP by applying signals to the test pads TP of the display device DD through the pins P, and one of the test units OS1-OS5 described above may be used to perform certain checks. The AVI system may perform inspection by the other inspection units OS1-OS5 while moving the stage ST to the target position.

When the pins P of the pinboard PB contact the test pads TP of the display device DD multiple times, foreign substances may be accumulated on the pins P and the positions of the pins P may be misaligned. As a result, poor connection with the test pads TP may occur, and discriminative ability may be lowered when determining whether the display device DD is good or bad. Therefore, it may be necessary to inspect and repair the pins P.

Referring to FIG. 4 for a display device DD that may be inspected in an AVI system, the display device DD may be a mobile phone, a smartphone, a tablet, a notebook computer, a monitor, a multimedia player, or a game machine that may be used to display images. The display device DD may include a display panel DP, and a driving integrated circuit chip DIC.

The display panel DP includes a display area DA corresponding to a screen on which an image is displayed, and circuits or signal lines for generating or transmitting various signals applied to the display area DA or a disposed non-display area NA may be included. The non-display area NA may surround the display area DA. In FIG. 4, the inside and outside of the dotted line rectangle may correspond to the display area DA and the non-display area NA, respectively.

Pixels PX may be arranged in a matrix in the display area DA of the display panel DP. Also, signal lines such as a gate line (also referred to as a scan line), a data line, and a driving voltage line may be disposed in the display area DA. The gate line may extend substantially in a first direction x, and the data line and the driving voltage line may extend approximately in a second direction y. A gate line, a data line, a driving voltage line, etc. are connected to each pixel PX, and each pixel PX may receive a gate signal (also referred to as a scan signal), a data voltage, a driving voltage, etc. from these signal lines. Each pixel PX may include a light emitting device such as a light emitting diode and a pixel circuit unit connected thereto. The pixel circuit unit may generate a driving current based on signals applied through signal lines such as a gate line and a data line, and apply it to the light emitting device.

Touch electrodes TE1, TE2 (see FIG. 13) for detecting a user's contact or non-contact touch may be disposed in the display area DA. The touch electrodes TE1, TE2 may sense a touch using a mutual sensing capacitor method or a self-sensing capacitor method. Although a substantially rectangular display area DA is shown, the display area DA may have various shapes other than a rectangle, such as a polygon, a circle, or an ellipse. In the non-display area NA of the display panel DP, a pad portion PP in which pads for receiving signals from the outside of the display panel DP are arranged is positioned. The pad portion PP may be positioned along the first direction x or along one edge of the display panel DP. A flexible printed circuit layer (not shown) may be bonded to the pad portion PP, and pads of the flexible printed circuit layer may be electrically connected to pads of the pad portion PP.

In the non-display area NA of the display panel DP, test pads TP may be positioned on both sides or one side of the pad portion PP. The pins P of the pinboard PB may be connected to the test pads TP, the AVI system inspects the display device through the pins P and the test pads TP of the pinboard PB, and signals for the display may be applied to the display device.

A driving unit that generates or processes various signals for driving the display panel DP may be positioned in the non-display area NA of the display panel DP. The driving device includes a data driver for applying data voltages to data lines, a gate driver for applying gate signals to gate lines, and a signal controller for controlling the data driver and gate driver. The pixels PX may receive data voltages at predetermined times according to gate signals generated by the gate driver. The gate driver may be integrated on the display panel DP and positioned on at least one side of the display area DA. The data driver and the signal controller may be provided as a driving integrated circuit chip DIC, and the driving integrated circuit chip DIC may be mounted in the non-display area NA of the display panel DP. The driving integrated circuit chip DIC may be mounted on a flexible printed circuit film or the like and electrically connected to the display panel DP.

Figure 5:
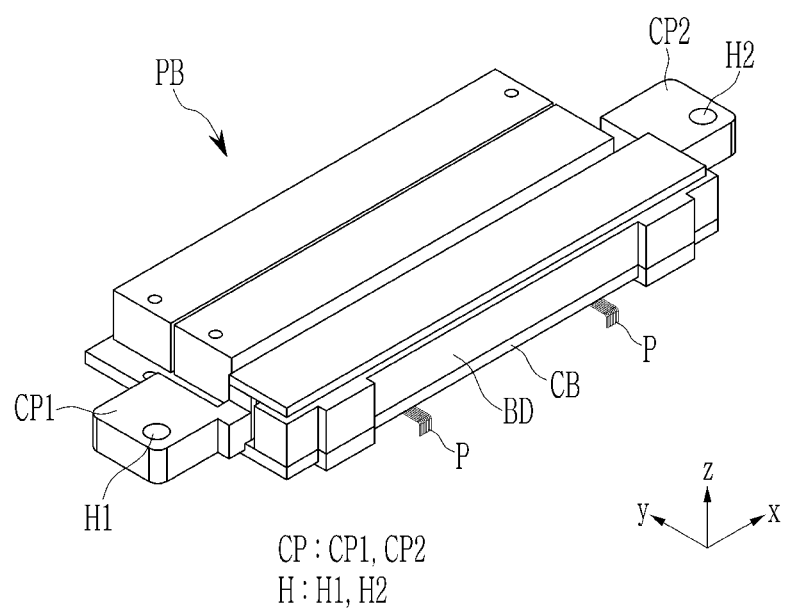
FIG. 5 is a perspective view schematically illustrating a pinboard according to an embodiment.
Figure 6:
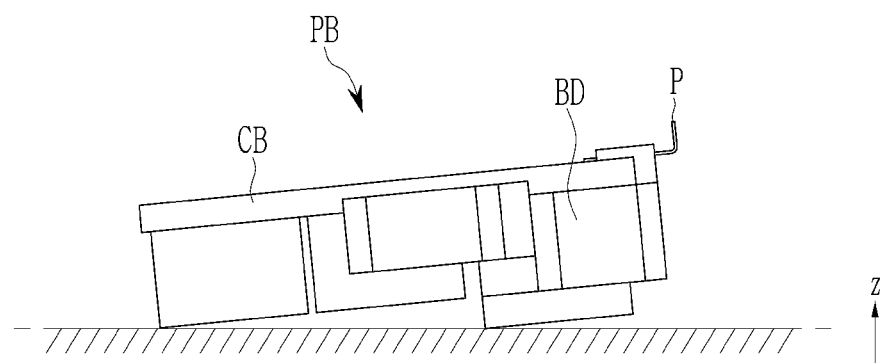
FIG. 6 is a side view schematically illustrating a state in which a pinboard is placed on the flat surface according to an embodiment.

FIG. 5 is a perspective view schematically illustrating a pinboard according to an embodiment, and FIG. 6 is a side view schematically illustrating a state in which the pinboard is placed on a flat surface according to an embodiment.

Referring to FIG. 5, the pinboard PB may include a body BD, a printed circuit board CB, pins P, and the like. The body BD may detachably couple the pinboard PB to the AVI system. The body BD may include a coupling portion CP, and the coupling portion CP may include a hole H. The coupling portion CP may include a first coupling portion CP1 protruding to one side of the printed circuit board CB and a second coupling portion CP2 protruding to the other side of the printed circuit board CB. The first coupling portion CP1 may include a first hole H1, and the second coupling portion CP2 may include a second hole H2. As shown in FIG. 1, each stage ST may include a support SP and a bracket BK movably coupled to the support SP. The pinboard PB may be detachably coupled to the bracket BK by inserting the protrusion of the bracket BK into the hole H of the coupling portion CP. The printed circuit board CB may be coupled to the body BD. The pins P may be connected to the printed circuit board CB. The pins P may be connected to wires formed on the printed circuit board CB. The pins P may protrude from the printed circuit board CB. The pins P may be formed of metal or metal alloy. Each of the pins P may have a shape of a wire bent in an approximate "¬" shape. For example, the pins P may include a portion extending parallel to the second direction y and a portion extending parallel to the third direction z. The pinboard PB may be arranged so that the printed circuit board CB is positioned at the bottom and the tip of the pin P is downward in the AVI system.

Referring to FIG. 6, since the pins P of the pinboard PB are positioned below the pinboard PB, in order to inspect the pins P using a microscope (e.g., a stereo microscope), the pinboard PB should be reversed. However, due to the shape of the pinboard PB, the printed circuit board CB and the pins P connected to the printed circuit board CB in the pinboard PB placed on the flat surface in an upside-down state are not horizontal but inclined. In this state, it may be difficult to inspect the pins P and remove the foreign substances accumulated on the pins P by brushing, polishing, or the like.

Figure 7:
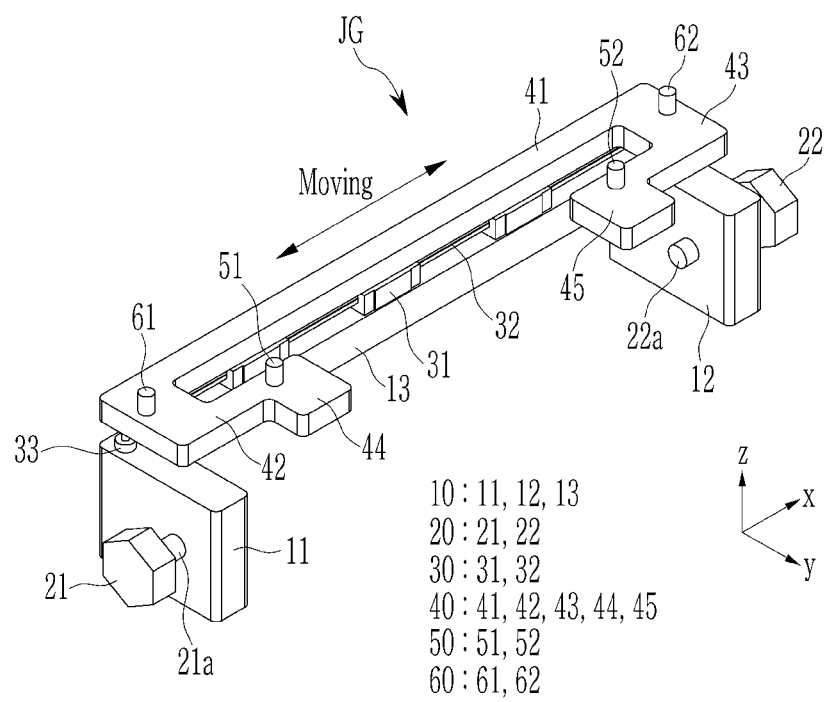
FIG. 7 is a perspective view schematically illustrating a pinboard repair jig according to an embodiment.
Figure 8:
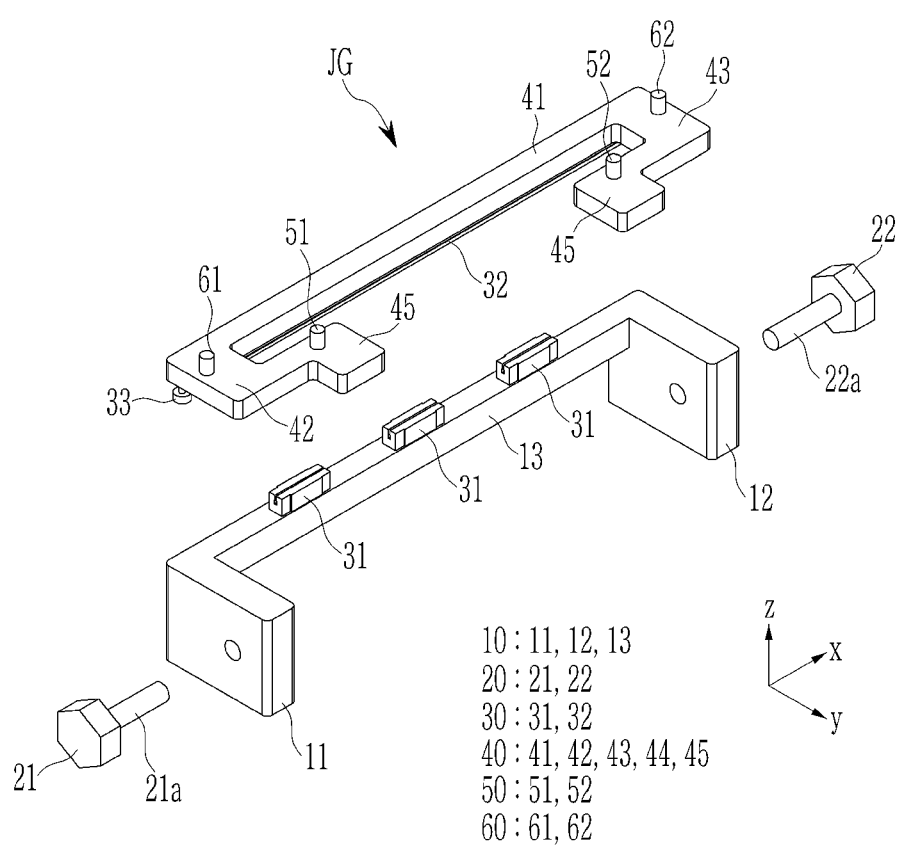
FIG. 8 is an exploded perspective view schematically illustrating a pinboard repair jig according to an embodiment.
Figure 9:
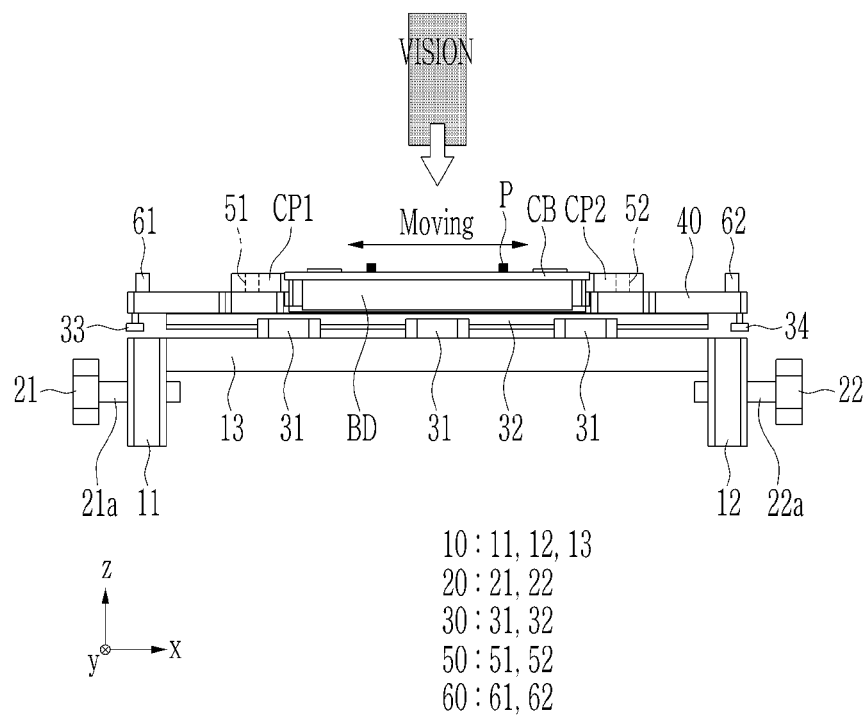
FIG. 9 is a front view schematically illustrating a pinboard assembly in which a pinboard is mounted on a pinboard repair jig according to an embodiment.
Figure 10:
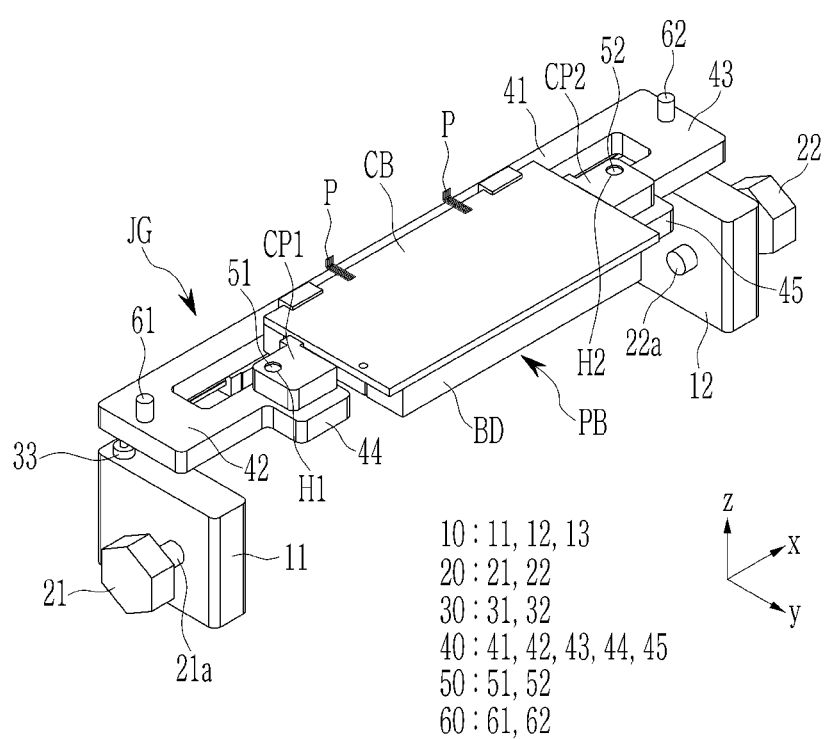
FIG. 10 and FIG. 11 are perspective views schematically illustrating a pinboard assembly in which a pinboard is mounted on a pinboard repair jig according to an embodiment.
Figure 11:
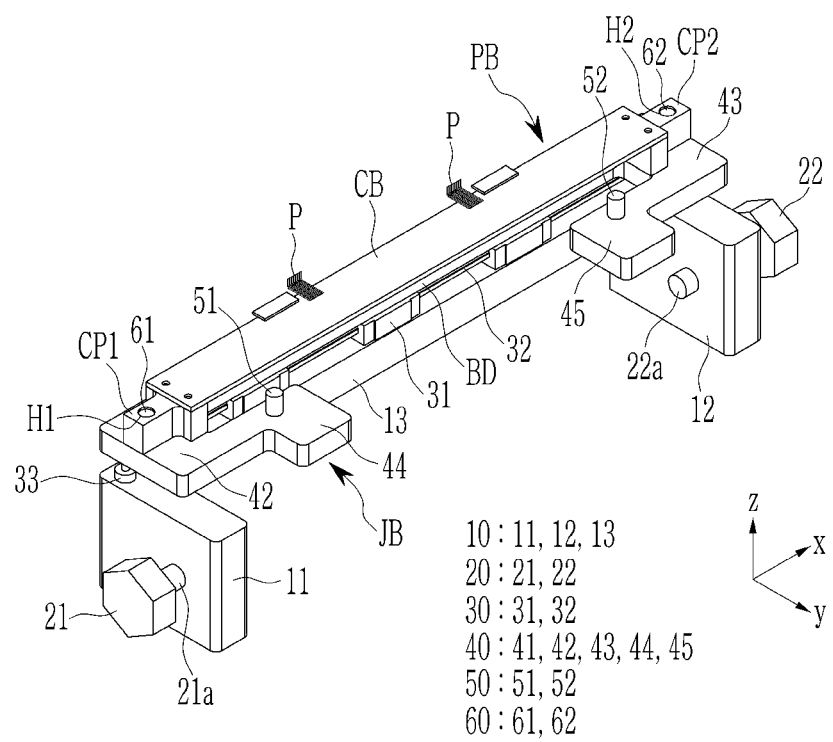

FIG. 7 is a perspective view schematically showing a pinboard repair jig according to an embodiment, FIG. 8 is an exploded perspective view schematically showing a pinboard repair jig according to an embodiment, and FIG. 9 is a pinboard repair jig according to an embodiment, and it is a front view schematically showing the pinboard assembly in which the pinboard is mounted on the board repair jig. FIG. 10 and FIG. 11 are perspective views schematically illustrating a pinboard assembly in which a pinboard is mounted on a pinboard repair jig according to an embodiment.

Referring to FIG. 7 and FIG. 8, a pinboard repair jig JG that may be fixed to easily inspect and repair the pinboard PB is shown. Referring to FIG. 9, FIG. 10 and FIG. 11, the pinboard PB may be mounted in an inverted state on the repair jig JG for pinboard repair—that is, with the printed circuit board CB and pins P positioned on the upper side. In this way, the pinboard PB mounted on the pinboard repair jig JG is referred to as a pinboard assembly. A pinboard repair jig JG (hereinafter, simply referred to as a "jig") may include a support 10, a fixing knob 20, a linear motion guide 30, a top plate 40, a first location pin 50, and a second location pin 60.

The support 10 may support the top plate 40 spaced apart from the flat surface at a predetermined interval. The support 10 may have a substantially "π" shape when viewed from a plan view to prevent the support plate 13 from sagging during inspection and repair of the pinboard PB. For example, the support 10 includes a first leg 11 and a second leg 12 extending in a longitudinal direction and spaced apart from each other, and the first leg 11 and the second leg extend in a transverse direction. It may include a support plate 13 connected to the second leg 12. The gap between the first leg 11 and the second leg 12 may be wider than the width of the microscope base to which the jig JG is fixed. The support 10 may be formed of a material having high rigidity (e.g., metal or alloy).

The fixing knob 20 may be used to affix the jig JG to the microscope. The fixing knob 20 may include a first fixing knob 21 positioned on the first leg 11 and a second fixing knob 22 positioned on the second leg 12. The first fixing knob 21 and the second fixing knob 22 may each include an adjustment screw 21a, 22a having threads formed on outer circumferential surfaces thereof. The adjustment screws 21a, 22a may be fastened to fastening holes formed in the first leg 11 and the second leg 12. By rotating the fixing knob 20, the adjustment screws 21a, 22a may be tightened or loosened. The jig JG may include only one of the first fixing knob 21 and the second fixing knob 22. Instead of the fixing knob 20, the jig JG may include a fixing means such as a vise handle, a spring clamp, a toggle clamp, or the like.

The linear motion guide 30 is positioned between the support 10 and the top plate 40, and allows the top plate 40 to move in a direction parallel to the first direction x on the support 10. The linear motion guide 30 may include a linear block 31 and a linear rail 32. The linear rail 32 may extend in the first direction x, and the linear block 31 and the linear rail 32 may be coupled to be relatively movable. Balls are disposed inside the linear block 31, and the linear motion guide 30 may move the load smoothly by supporting the load using the ball as a medium and reducing the friction coefficient. In order to improve straightness in the first direction x, the linear motion guide 30 may include a plurality of linear blocks 31 aligned in the first direction x—for example, three linear blocks 31. The linear block 31 may be coupled to the support plate 13 of the support 10, and the linear rail 32 may be coupled to the top plate 40. Since the linear block 31 is coupled to the fixed support 10, the linear rail 32 may move in a direction parallel to the first direction x along the groove of the linear block 31. Unlike the drawing, the linear block 31 may be coupled to the top plate 40 and the linear rail 32 may be coupled to the support plate 13. In this case, the linear block 31 may move along the linear rail 32 in a direction parallel to the first direction x.

The top plate 40 may be positioned on the support 10. The top plate 40 may be coupled to the support 10 to be movable in a direction parallel to the first direction x by the linear motion guide 30. The top plate 40 may have overall flat top and bottom surfaces. A linear rail 32 may be coupled to the lower surface of the top plate 40, and the linear rail 32 may be coupled to the linear block 31. As the linear rail 32 moves in a direction parallel to the first direction x with respect to the linear block 31, the top plate 40 may move in a direction parallel to the first direction x.

First and second stoppers 33, 34 may be positioned on the lower surface of the top plate 40. The first and second stoppers 33, 34 may protrude downward from the lower surface of the top plate 40. The first and second stoppers 33, 34 may be positioned on both sides of the linear rail 32 and may be positioned on the same line as the linear block 31 or the linear rail 32. When the top plate 40 moves, the first and second stoppers 33, 34 may come into contact with the linear block 31. For example, referring to FIG. 9, when the top plate 40 moves in the first direction x (i.e., to the right), the first stopper 33 may move until it comes into contact with the left linear block 31, and when the top plate 40 moves in a direction opposite to the first direction x (i.e., to the left), the second stopper 34 may move until it comes into contact with the linear block 31 on the right side. As such, the first and second stoppers 33, 34 may limit the movement of the top plate 40 and limit the stroke.

The top plate 40 may be designed to have a structure without interference between parts in consideration of the size and weight of the pinboard PB mounted thereon. The top plate 40 may be formed of a material having high rigidity such as metal or metal alloy. The top plate 40 includes a first part 41 extending in a first direction x, a second part 42 and a third part 43 bent from both ends of the first part 41, and a fourth part 44 and a fifth part 45 respectively bent from the second part 42 and the third part 43. The second part 42 and the third part 43 may extend from the first part 41 in the second direction y. The fourth part 44 may extend from the second part 42 in the first direction x, and the fifth part 45 may extend from the third part 43 in a direction opposite to the first direction x. The fourth part 44 and the fifth part 45 may face each other, and may be spaced apart at predetermined intervals. The gap between the fourth part 44 and the fifth part 45 may accommodate a portion of the body BD protruding downward from the coupling portion CP in the pinboard PB. Accordingly, the pinboard PB may be mounted on the top plate 40 so that the lower surface of the pinboard PB—that is, the printed circuit board CB of the pinboard PB—is in a horizontal state. Also, the tip of the pin P of the pinboard PB may be disposed upward—that is, to face in the third direction z. The first part of the top plate 41 may overlap the support plate 13 of the support 10. In a state in which the center of the top plate 40 and the center of the support 10 are aligned, the first part 41, the second part 42, and the third part 43 of the top plate 40 may overlap the support plate 13, the first leg 11, and the second leg 12 of the support 10, respectively. The linear rail 32 may be coupled to the lower surface of the first part 41. The stoppers 33, 34 may be coupled to the lower surface of the first part 41 or the lower surface of the second and third parts 42, 43 of the top plate.

A first location pin 50 and a second location pin 60 may be positioned on the upper surface of the top plate 40. The first location pin 50 and the second location pin 60 may protrude upward from the upper surface of the top plate 40. The first location pin 50 and the second location pin 60 may be used to couple pinboards PB of different types and specifications. For example, the first location pin 50 may be used to couple a pinboard PB that applies signals for inspecting pixels of the display device DD, and the second location pin 60 may be used to couple a pinboard PB that applies signals for inspecting a touch sensor of the display device DD. Since the jig JG includes the first location pin 50 and the second location pin 60, two types of pinboards PB may be mounted. The positions of the first location pin 50 and the second location pin 60 may be changed according to the state of the pinboard PB to be mounted, and the jig JG may further include other location pins.

The first location pin 50 may include a pair of first location pins 51, 52. The first location pins 51, 52 may be positioned on the fourth and fifth parts 44, 45 of the top plate. The second location pin 60 may include a pair of second location pins 61, 62. The second location pins 61, 62 may be positioned on the second and third parts 42, 43 of the top plate. FIG. 9 and FIG. 10 illustrate a state in which the pinboard PB is coupled to the first location pin 50, and FIG. 11 illustrates a state in which the pinboard PB is coupled to the second location pin 60. The first location pins 51, 52 or the second location pins 61, 62 fit into the corresponding holes H1, H2 of the first and second coupling portions CP1, CP2 of the pinboard PB, the first location pins 51, 52 or the second location pins 61, 62 may be positioned in the corresponding holes H1, H2 and second coupling portions CP1, CP2 of the pinboard PB may be inserted. Such an installation may be easily performed by aligning the holes H1, H2 of the first and second coupling portions CP1, CP2 of the pinboard PB with the corresponding first location pins 51, 52 or second location pins 61, 62 and placing the pinboard PB down. In addition, the pinboard PB may be separated from the jig JG by lifting the pinboard PB upward.

Figure 12:
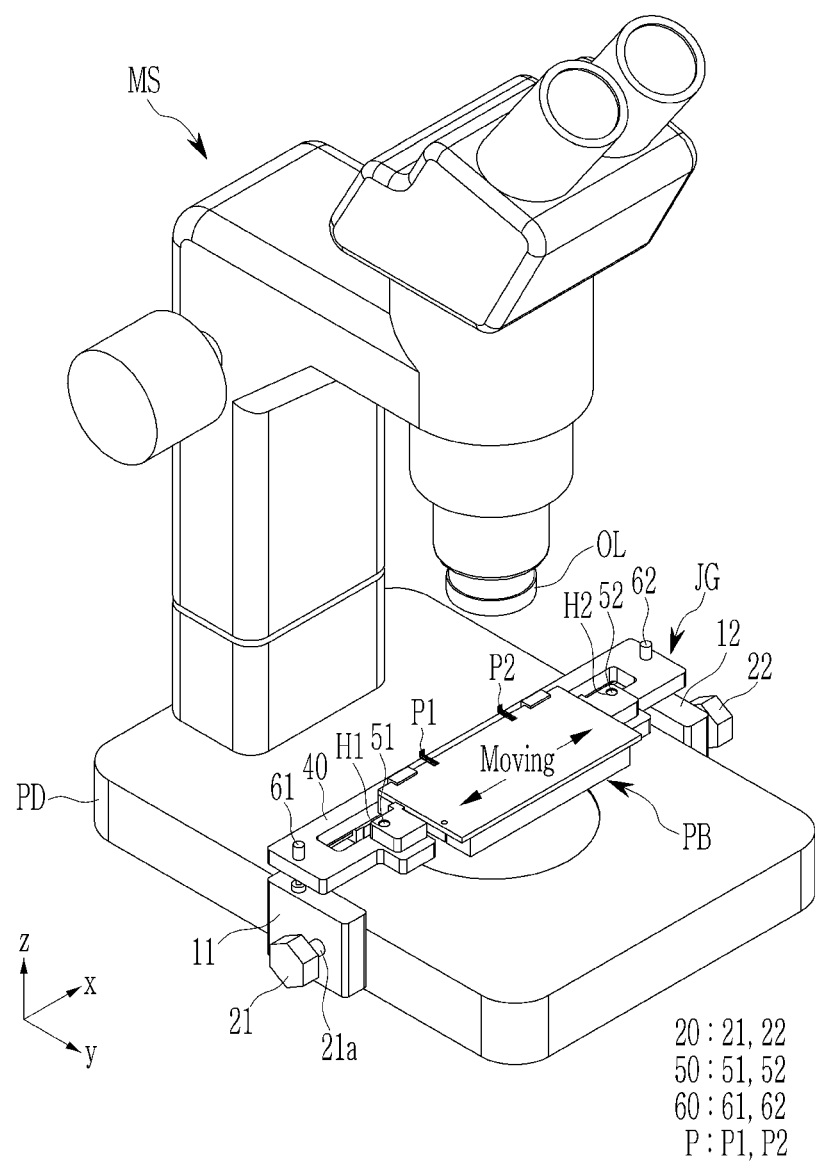
FIG. 12 is a drawing schematically showing a state in which a pinboard assembly is seated on a microscope according to an embodiment.

FIG. 12 is a view schematically showing a drawing in which a pinboard assembly is seated on a microscope according to an embodiment.

Referring to FIG. 12, a state in which the pinboard assembly is seated on the microscope MS for inspection and repair is shown. The jig JG may be affixed to the microscope MS before mounting the pinboard PB. For example, the jig JG is placed on the base PD of the microscope MS so that the first leg 11 and the second leg 12 of the support 10 are positioned on both sides of the base PD of the microscope MS, so it is possible to arrange and fix the jig JG using the first fixing knob 21 or the second fixing knob 22. When the first fixing knob 21 is turned clockwise, the adjusting screw 21a may advance toward the pedestal PD, and when the second fixing knob 22 is turned clockwise, the adjusting screw 22a may advance toward the pedestal PD. In this way, the support 10 may be clamped to the pedestal PD by rotating the first fixing knob 21 or the second fixing knob 22.

After fixing the jig JG, the hole H of the pinboard PB may be aligned with the first location pin 50 or the second location pin 60 to seat the pinboard PB on the top plate of the jig JG. Then, while moving the top plate 40 left and right, the pins P may be inspected with the microscope MS, and appropriate repairs such as brushing, polishing, and cleaning may be performed on the pins P. For example, after moving the top plate 40 to the right (i.e., in the first direction x) so that the pins P1 positioned on the left side of the pinboard PB are aligned with the objective lens OB, the pins P1 are inspected and repaired, and then the top plate 40 is moved to the left so that the pins P2 positioned on the right side of the pinboard PB are aligned with the objective lens OB (that is, in the opposite direction to the first direction x) after moving the pins P2 and may be inspected and repaired. Accordingly, it is possible to quickly and conveniently inspect and repair the pins P1, P2 that are spaced apart from side to side. Since the jig JG is clamped by the fixing knob 20, the movement of the top plate 40 and the pinboard PB may be stabilized. After the pinboard PB is inspected and repaired, the pinboard PB is detached and another pinboard PB is mounted on the jig JG to continue the inspection and repair.

In this way, by mounting the pinboard PB on the pinboard repair jig JG and repairing it through visual inspection using the microscope MS, the pinboard repair procedure may be standardized and made efficient. In addition, the pinboard PB may be inspected and repaired in the field without taking it out, and accordingly, the work is convenient and the repair period and repair cost may be reduced.

Figure 13:
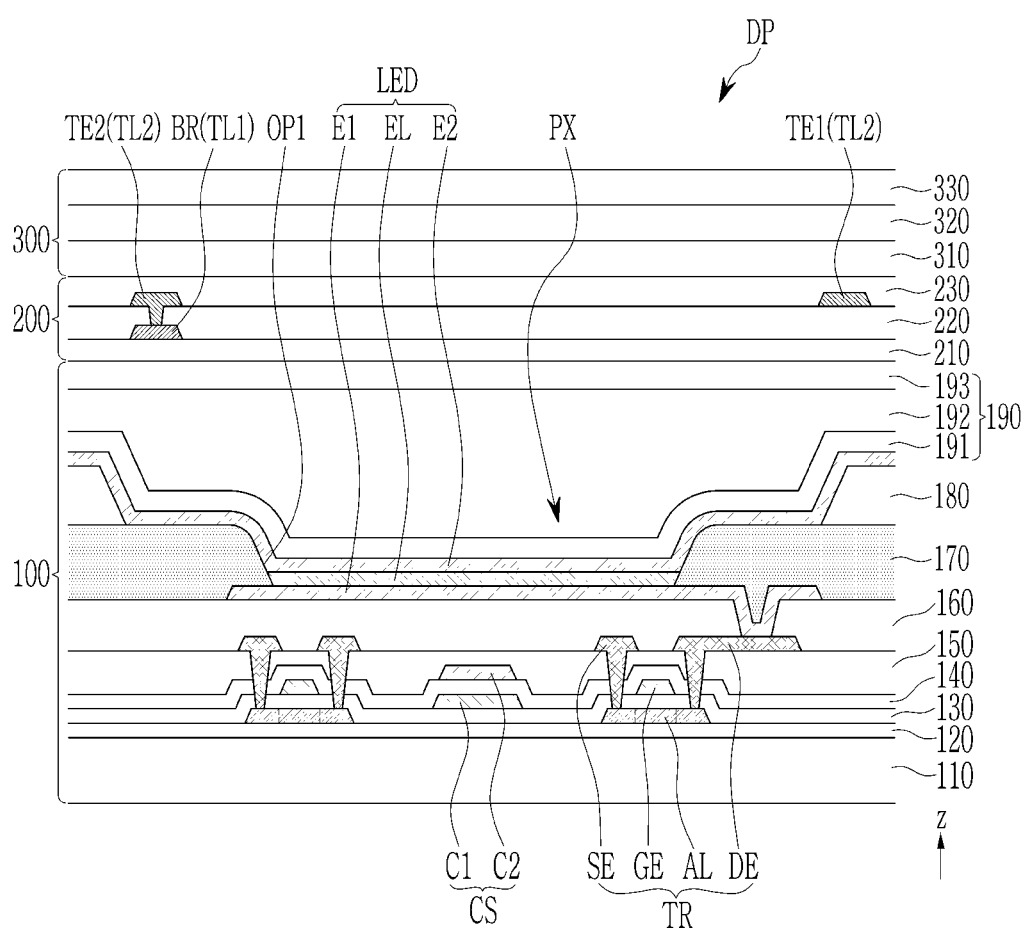
FIG. 13 is a schematic cross-sectional view of a display panel according to an embodiment.

FIG. 13 is a schematic cross-sectional view of a display panel according to an embodiment.

Referring to FIG. 13, the structure of the display panel DP that may be inspected using the pinboard PB will be described. The display panel DP may include a display unit 100, a touch sensor unit 200, and an anti-reflection unit 300.

The display unit 100 may basically include a substrate 110, a transistor TR formed on the substrate 110, and a light emitting diode LED connected to the transistor TR. The light emitting diode LED may correspond to the pixel PX.

The substrate 110 may be a flexible substrate including a polymer such as polyimide, polyamide, or polyethylene terephthalate. The substrate 110 may include a barrier layer for preventing penetration of moisture or the like, and the barrier layer may include an inorganic insulating material such as silicon nitride ($SiN_x$), silicon oxide ($SiO_x$), or silicon oxynitride ($SiO_xN_y$). The substrate 110 may be a rigid substrate including glass.

A buffer layer 120 may be positioned on the substrate 110. When the semiconductor layer AL is formed, the buffer layer 120 blocks impurities from the substrate 110 to improve the characteristics of the semiconductor layer AL, and flattens the surface of the substrate 110 to reduce stress in the semiconductor layer AL. The buffer layer 120 may include an inorganic insulating material such as silicon nitride, silicon oxide, or silicon oxynitride. The buffer layer 120 may also include amorphous silicon.

A semiconductor layer AL may be positioned on the buffer layer 120. The semiconductor layer AL may include a first region, a second region, and a channel region between these regions. The semiconductor layer AL may include polycrystalline silicon, amorphous silicon, or an oxide semiconductor.

A first gate insulating layer 130 may be positioned on the semiconductor layer AL. The first gate insulating layer 130 may include an inorganic insulating material such as silicon oxide, silicon nitride, or silicon oxynitride, and may have a single layer or multiple layers.

A first gate conductive layer including a gate electrode GE may be positioned on the first gate insulating layer 130. The first gate conductive layer may include molybdenum (Mo), aluminum (Al), copper (Cu), titanium (Ti), tungsten (W), or the like, and may be a single layer or multiple layers.

A second gate insulating layer 140 may be positioned on the first gate conductive layer. The second gate insulating layer 140 may include an inorganic insulating material such as silicon nitride, silicon oxide, or silicon oxynitride, and may have a single layer or multiple layers.

A second gate conductive layer that may include the second electrode C2 of the storage capacitor CS may be positioned on the second gate insulating layer 140. The second electrode C2 may overlap the first electrode C1, and the first electrode C1, the second electrode C2, and the second gate insulating layer 140 therebetween may form a storage capacitor CS. The second gate conductive layer may include molybdenum (Mo), aluminum (Al), copper (Cu), titanium (Ti), tungsten (W), or the like, and may be a single layer or multiple layers.

An interlayer insulating layer 150 may be positioned on the second gate conductive layer. The interlayer insulating layer 150 may include an inorganic insulating material such as silicon nitride, silicon oxide, or silicon oxynitride, and may have a single layer or multiple layers. When the interlayer insulating layer 150 has multiple layers, the lower layer may include silicon nitride and the upper layer may include silicon oxide.

A first data conductive layer that may include the first electrode SE and the second electrode DE of the transistor TR may be positioned on the interlayer insulating layer 150. One of the first electrode SE and the second electrode DE may be a source electrode of the transistor TR, and the other may be a drain electrode of the transistor TR. The first data conductive layer includes aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), copper (Cu), etc., and may be a single layer or multiple layers. For example, the first data conductive layer may have a triple-layer structure such as titanium (Ti)-aluminum (Al)-titanium (Ti) or a double-layer structure such as titanium (Ti)-copper (Cu).

A planarization layer 160 may be positioned on the first data conductive layer. The planarization layer 160 may include a general-purpose polymer such as poly(methyl methacrylate) and polystyrene, a polymer derivative having a phenolic group, an acrylic polymer, an imide polymer (e.g., polyimide), or an organic insulating material such as a siloxane-based polymer.

A pixel electrode E1 of a light emitting diode LED may be positioned on the planarization layer 160. The pixel electrode E1 may be connected to the second electrode DE through a contact hole formed in the planarization layer 160. The pixel electrode E1 may be formed of a reflective conductive material or a transflective conductive material, or may be formed of a transparent conductive material. The pixel electrode E1 may include a transparent conductive material such as indium tin oxide (ITO) or indium zinc oxide (IZO). The pixel electrode E1 may include a metal such as lithium (Li), calcium (Ca), aluminum (Al), silver (Ag), magnesium (Mg), or gold (Au). The pixel electrode E1 may have a multilayer structure—for example, a triple-layer structure such as ITO-silver (Ag)-ITO.

A partition 170 (also referred to as a pixel defining layer or a bank) having an opening OP1 overlapping the pixel electrode E1 may be positioned on the planarization layer 160. The partition 170 may define a light emitting region. The partition 170 may include an organic insulating material such as an acryl-based polymer, an imide-based polymer (e.g., polyimide), or an amide-based polymer (e.g., polyamide). The partition 170 may be a black partition including a colored pigment such as a black pigment or a blue pigment. For example, the partition 170 may include a mixture of a polyimide binder and red, green, and blue pigments. For example, the partition 170 may include a cardo binder resin and a mixture of lactam black pigment and blue pigment. The partition 170 may include carbon black. The black partition may improve the contrast ratio and prevent reflection by the metal layer positioned below.

An emission layer EL may be positioned on the pixel electrode E1. At least a portion of the light emitting layer EL may be positioned within the opening OP1. The light emitting layer EL may include a material layer that uniquely emits light of basic colors such as red, green, and blue. The light emitting layer EL may have a structure in which material layers emitting light of different colors are stacked. In addition to the emission layer EL, at least one of a hole injection layer, a hole transport layer, an electron transport layer, and an electron injection layer may be positioned on the pixel electrode E1.

A spacer 180 may be positioned on the partition 170. The spacer 180 may include an organic insulating material such as an acrylic polymer, an imide polymer, or an amide polymer.

A common electrode E2 may be positioned on the light emitting layer EL and the partition 170. The common electrode E2 may be positioned over the plurality of pixels PX. The common electrode E2 is calcium (Ca), barium (Ba), magnesium (Mg), aluminum (Al), silver (Ag), platinum (Pt), palladium (Pd), gold (Au), nickel (Ni), neodymium (Nd), iridium (Ir), and chromium (Cr), and may include a metal such as lithium (Li). The common electrode E2 may include a transparent conductive oxide (TCO) such as indium tin oxide (ITO) or indium zinc oxide (IZO).

The pixel electrode E1, the light emitting layer EL, and the common electrode E2 may form a light emitting diode LED that may be an organic light emitting diode.

The pixel electrode E1 may be an anode that is a hole injection electrode, and the common electrode E2 may be a cathode that is an electron injection electrode, or vice versa. The opening OP1 of the partition 170 may correspond to a light emitting region of the light emitting diode LED.

An encapsulation layer 190 may be positioned on the common electrode E2. The encapsulation layer 190 may seal the light emitting diodes LED and prevent penetration of moisture or oxygen from the outside. The encapsulation layer 190 may be a thin film encapsulation layer including one or more inorganic layers and one or more organic layers stacked on the common electrode E2. For example, the encapsulation layer 190 may have a triple-layer structure of a first inorganic layer 191, a second organic layer 192, and a third inorganic layer 193.

A first insulating layer 210 of the touch sensor unit 200 may be positioned on the encapsulation layer 190. The first insulating layer 210 may cover the encapsulation layer 190 to protect the encapsulation layer 190 and prevent moisture permeation. The first insulating layer 210 may reduce parasitic capacitance between the common electrode E2 and the touch electrodes TE1, TE2.

A first touch conductive layer TL1 that may include a bridge BR may be positioned on the first insulating layer 210. A second insulating layer 220 may be positioned on the first touch conductive layer TL1. A second touch conductive layer TL2 including touch electrodes TE1, TE2 may be positioned on the second insulating layer 220. A passivation layer 230 may be positioned on the second touch conductive layer TL2. The touch electrodes TE1, TE2 may include first touch electrodes TE1 and second touch electrodes TE2 forming a mutual sensing capacitor. The bridge BR may electrically connect the second touch electrodes TE2. For example, the adjacent but separated second touch electrodes TE2 may be connected to the bridge BR through contact holes formed in the second insulating layer 220 and electrically connected through the bridge BR.

The first insulating layer 210 and the second insulating layer 220 may include an inorganic insulating material such as silicon nitride, silicon oxide, or silicon oxynitride, and may be a single layer or multiple layers. The passivation layer 230 may include an organic insulating material such as an acrylic polymer or an imide polymer or an inorganic insulating material such as silicon nitride, silicon oxide, or silicon oxynitride.

The first touch conductive layer TL1 and the second touch conductive layer TL2 may have an opening overlapping the light emitting region of the light emitting diode LED. The first touch conductive layer TL1 and the second touch conductive layer TL2 may include aluminum (Al), copper (Cu), titanium (Ti), molybdenum (Mo), silver (Ag), chromium (Cr), nickel (Ni) and the like, and may be a single layer or multiple layers. For example, the first touch conductive layer TL1 or the second touch conductive layer TL2 may have a triple-layer structure such as titanium (Ti)/aluminum (Al)/titanium (Ti).

An anti-reflection unit 300 may be positioned on the passivation layer 230. The anti-reflection unit 300 may include a first phase delay layer 310, a second phase delay layer 320, and a polarization layer 330 sequentially positioned on the passivation layer 230. The antireflection unit 300 may be implemented by a combination of a color filter and a light blocking member or a combination of reflective layers causing destructive interference.

The structure of the display panel DP described above is exemplary and may be variously changed. For example, the display panel DP may not include some of the components or layers described above or may further include components or layers different from those described above.

While the present disclosure has been described with reference to embodiments thereof, it will be apparent to those of ordinary skill in the art that various changes and modifications may be made thereto without departing from the scope and spirit of the present disclosure as set forth in the following claims.

What is claimed is:

1. A pinboard repair jig, comprising:
a support;
a top plate disposed on the support and on which a pinboard is mountable;
a linear motion guide disposed between the support and the top plate; and
a location pin protruding upward from the top plate and to which the pinboard is coupled,
wherein the linear motion guide is connected between the support and the top plate such that the top plate moves in a horizontal direction relative to the support.

2. The pinboard repair jig of claim 1, wherein:
the support includes a first leg and a second leg spaced apart from each other and extending in a vertical direction, and a support plate connected to the first leg and the second leg and extending in the horizontal direction.

3. The pinboard repair jig of claim 2, further comprising:
a fixing knob disposed at the first leg or the second leg.

4. The pinboard repair jig of claim 3, wherein:
the fixing knob is fastened to a fastening hole formed in the first leg or the second leg.

5. The pinboard repair jig of claim 1, wherein:
the linear motion guide includes a linear rail extending in a first direction and a linear block coupled to the linear rail, and
the top plate is linearly movable in the first direction.

6. The pinboard repair jig of claim 5, wherein:
the linear block is coupled to the support, and the linear rail is coupled to the top plate.

7. The pinboard repair jig of claim 5, further comprising:
stoppers disposed on a same line as the linear block or the linear rail on both sides of the linear rail and coupled to the top plate.

8. The pinboard repair jig of claim 1, wherein:
the linear motion guide includes a plurality of linear blocks aligned in a first direction and a linear rail engaged with the plurality of linear blocks.

9. The pinboard repair jig of claim 1, wherein:
the location pin includes a first location pin and a second location pin for mounting different types of pinboards.

10. The pinboard repair jig of claim 1, wherein:
the top plate includes a first portion extending in a first direction, second and third portions extending from both ends of the first portion in a second direction, a fourth portion extending from the second portion in the first direction, and a fifth portion extending from the third portion in a direction opposite to the first direction.

11. The pinboard repair jig of claim 10, wherein:
the fourth portion and the fifth portion face each other and are spaced apart at a predetermined interval.

12. The pinboard repair jig of claim 10, wherein:
the location pin includes a pair of first location pins disposed at the fourth portion and the fifth portion.

13. The pinboard repair jig of claim 12, wherein:
the location pins further include a pair of second location pins disposed at the second portion and the third portion.

14. A pinboard assembly, comprising:
a pinboard repair jig; and
a pinboard detachably coupled to the pinboard repair jig,
wherein the pinboard repair jig comprises:
a support;
a top plate disposed on the support and on which the pinboard is mounted;
a linear motion guide disposed between the support and the top plate, and
a location pin protruding upward from the top plate and to which the pinboard is coupled,
wherein the pinboard comprises:
a body including a coupling portion in which a hole is formed;
a printed circuit board coupled to the body; and
pins connected to the printed circuit board,
wherein the pinboard is mounted on the top plate such that the location pin is inserted into the hole and the printed circuit board is oriented upward, and
wherein the linear motion guide is connected between the support and the top plate such that the top plate moves in a horizontal direction relative to the support.

15. The pinboard assembly of claim 14, wherein:
the linear motion guide includes a linear rail coupled to the top plate and extending in a first direction, and a linear block coupled to the support and engaged with the linear rail, and
the top plate and the pinboard are linearly movable in the first direction.

16. The pinboard assembly of claim 15, wherein:
the pinboard repair jig further includes stoppers disposed on both sides of the linear rail on a same line as the linear block or the linear rail and coupled to the top plate.

17. The pinboard assembly of claim 14, wherein:
the support includes a first leg and a second leg spaced apart from each other and extending in a vertical direction, and a support plate connected to the first leg and the second leg and extending in the horizontal direction, and
the pinboard repair jig further includes a fixing knob disposed at the first leg or the second leg.

18. The pinboard assembly of claim 14, wherein:
the location pin includes a first location pin and a second location pin for mounting different types of pinboards.

19. The pinboard assembly of claim 14, wherein:
the top plate includes a first portion extending in a first direction, second and third portions extending from both ends of the first portion in a second direction, a fourth portion extending from the second portion in the first direction, and a fifth portion extending from the third portion in a direction opposite to the first direction.

20. The pinboard assembly of claim 19, wherein:
the fourth portion and the fifth portion face each other and are spaced apart at predetermined intervals, and
the gap between the fourth portion and the fifth portion accommodates a portion of the body which protrudes downward from the coupling portion.

* * * * *